United States Patent
Saindon et al.

(10) Patent No.: US 10,557,550 B2
(45) Date of Patent: Feb. 11, 2020

(54) FLEXIBLE JOINT

(71) Applicant: Mide Technology Corporation, Medford, MA (US)

(72) Inventors: Luke Clovis Saindon, Somerville, MA (US); Noel Jared Keegan, Medford, MA (US); Marthinus van Schoor, Arlington, MA (US)

(73) Assignee: Mide Technology Corporation, Woburn, MA (US)

( * ) Notice: Subject to any disclaimer, the term of this patent is extended or adjusted under 35 U.S.C. 154(b) by 543 days.

(21) Appl. No.: 15/092,851

(22) Filed: Apr. 7, 2016

(65) Prior Publication Data

US 2016/0297504 A1  Oct. 13, 2016

Related U.S. Application Data

(60) Provisional application No. 62/145,725, filed on Apr. 10, 2015.

(51) Int. Cl.
   *F16J 3/04* (2006.01)
   *B63C 11/10* (2006.01)

(52) U.S. Cl.
   CPC ............ *F16J 3/048* (2013.01); *B63C 11/10* (2013.01); *Y10T 403/32622* (2015.01); *Y10T 403/453* (2015.01)

(58) Field of Classification Search
   CPC . B63C 11/10; F16C 11/04; F16L 27/11; F16L 27/111; F16L 51/026; F16L 51/027; F16J 3/04; F16J 3/041; F16J 3/043; F16J 3/047; F16J 3/048; F16J 15/52

USPC ........ 464/175; 403/50, 51, 52, 82, 121, 223; 285/223, 226; 277/636; 2/2.15
See application file for complete search history.

(56) References Cited

U.S. PATENT DOCUMENTS

| | | | | |
|---|---|---|---|---|
| 65,760 | A * | 6/1867 | McKeen | B63C 11/04 |
| | | | | 2/2.15 |
| 2,013,547 | A * | 9/1935 | Badger | F16L 51/027 |
| | | | | 285/301 |
| 2,713,503 | A * | 7/1955 | Ekholm | F16L 51/027 |
| | | | | 285/139.2 |
| 2,954,562 | A * | 10/1960 | Krupp | A62B 17/00 |
| | | | | 2/2.14 |

(Continued)

FOREIGN PATENT DOCUMENTS

GB   879123 A * 10/1961 ............ F16L 51/027

OTHER PUBLICATIONS

Newtsuit, Wikipedia, http://en.wikipedia.org/wiki/Newtsuit, Apr. 7, 2015, five (5) pages.

*Primary Examiner* — Josh Skroupa
(74) *Attorney, Agent, or Firm* — Iandiorio Teska & Coleman, LLP

(57) ABSTRACT

A constant volume flexible joint system includes a flexible membrane for coupling across a joint and spaced radial support ribs fitted to the membrane. Axial support structures are coupled to the spaced radial support ribs preventing axial deformation of the joint due to a differential pressure. The axial support structure preferably include pivoting sockets and blocks enabling the joint to flex and the flexible membrane to contract on the inside of a bend and expand by an equal or near equal amount on the outside of the bend resulting in a constant volume joint that requires low or no torque throughout the bending motion.

28 Claims, 15 Drawing Sheets

(56) References Cited

U.S. PATENT DOCUMENTS

| | | | | |
|---|---|---|---|---|
| 3,168,334 | A | * | 2/1965 | Johnson .............. E21B 17/085 |
| | | | | 138/139 |
| 3,242,499 | A | * | 3/1966 | Fonda-Bonardi ... F16L 27/0857 |
| | | | | 2/2.13 |
| 3,527,481 | A | * | 9/1970 | Lewis .................... F16L 23/02 |
| | | | | 285/114 |
| 3,534,406 | A | * | 10/1970 | Barthlome ............... B64G 6/00 |
| | | | | 2/2.12 |
| 3,633,945 | A | * | 1/1972 | Press .................... F16L 51/027 |
| | | | | 285/226 |
| 4,059,293 | A | * | 11/1977 | Sipler .................... F16L 27/11 |
| | | | | 285/179 |
| 4,173,128 | A | * | 11/1979 | Corvelli ................. B29C 49/44 |
| | | | | 138/130 |
| 4,415,185 | A | * | 11/1983 | Vinciguerra ............ F16L 11/14 |
| | | | | 138/120 |
| 4,549,753 | A | | 10/1985 | Nuytten |
| 4,911,206 | A | * | 3/1990 | Gropp ..................... F16J 3/048 |
| | | | | 138/110 |
| 6,631,928 | B1 | * | 10/2003 | Sakata ................ F16L 27/1085 |
| | | | | 285/226 |
| 6,725,464 | B2 | | 4/2004 | Humphrey |
| 7,367,741 | B2 | * | 5/2008 | Vogler .................... E04C 3/285 |
| | | | | 403/121 |
| 9,568,133 | B2 | * | 2/2017 | Halkyard ................ F16L 27/02 |

\* cited by examiner

FLEXIBLE JOINT

RELATED APPLICATIONS

This application claims benefit of and priority to U.S. Provisional Application Ser. No. 62/145,725 filed Apr. 10, 2015, under 35 U.S.C. §§ 119, 120, 363, 365, and 37 C.F.R. § 1.55 and § 1.78 and which is incorporated herein by this reference.

GOVERNMENT RIGHTS

This invention was made with U.S. Government support under Contract No. N000014-14-C-0291 awarded by the US Navy Office of Naval Research Undersea Medicine Program Small Business Technology Transfer Topic N13A-T029. The Government may have certain rights in the subject invention.

FIELD OF INVENTION

This invention relates to a flexible joint useful, for example, in an atmospheric diving suit.

BACKGROUND OF THE INVENTION

Current atmospheric diving suits (ADS) (e.g., the Newtsuit) use rotary joints between rigid shell components. By positioning the rotary joints at various angles relative to each other a diver can move their arms, albeit in a somewhat abnormal fashion by rotating each one of these seals. See U.S. Pat. No. 6,725,464 incorporated herein by this reference. The most prominent rotary joint design is described in U.S. Pat. No. 4,549,753 incorporated herein by this reference. The hydraulically balanced rotary joint is designed to limit the increases in rotational resistance at depth. These joints have limited maneuverability especially for the versions designed for depths greater than 1000'. The series of rotary joints do not allow for natural human motion and often result in the human diver assuming extremely awkward postures.

SUMMARY OF THE INVENTION

Featured is a joint system designed for use, for example, on an ADS (Atmospheric Diving Suit). The membrane joint, described herein differs from main stream ADS joint design in that it is a flexible joint supported by an endo or exoskeleton instead of rigid components joined by sliding mechanical seals. This novel approach will provide several perceived benefits over the current rotary joint method in use today.

The joint allows for more realistic movements of arms and legs than the rotary joints can provide which reduces fatigue and improves the capabilities of an ADS which uses the joint design. There are fewer moving parts which will improve reliability and robustness. One design requires no sliding or rotating seals as the membrane which covers the endo or exoskeleton in the joint design eliminates the need for seals since there is a continuous flexible barrier. The current rotary seals are a major point of maintenance and failure. The flexible membrane approach to the ADS joint will allow for redundancy by multi-layering the membrane. By adding layers, the diver will be protected even if a membrane barrier is breached. The endoskeleton lying under the membrane in the design passively counteracts the pressure forces with a mechanism that does not require hydraulics or other working fluid. A hydraulic balance mechanism would likely require complicated tubing, valving and a reservoir adding bulk to the ADS joint and system. In contrast, the novel mechanical design improves reliability and decreases complexity while still maintaining ease of movement even at maximum diving depth. The large contact area of flexible joint's pivot block balance mechanism leads to reduced stress on the pivots and gives design flexibility to use a large range of roller bearing or low friction material options for the interface. This may be an important point from a survivability (axial hydrostatic loading is severe in deep water) and overall bulk of joint standpoint. Maneuverability is improved and joint flexibility is increased.

The use in ADS applications of a reinforced and flexible membrane suspended over a rigid endoskeleton protects the diver from the external hydrostatic loading of surrounding seawater. An optimized skeleton pivot geometry that maintains constant volume within the reinforced membrane. A constant volume joint is inherently one that balances hydrostatic loading and requires no torque to bend. The use of a multi-layered membrane which will increase redundancy reduce material resistance to bending and increase ADS factors of safety.

Featured is a constant volume flexible joint system comprising a flexible membrane for coupling across a joint and spaced radial support ribs fitted to the membrane. At least one axial support structure is coupled to the spaced radial support ribs preventing axial deformation of the joint due to pressure differential. The axial support structure includes pivoting portions enabling the joint to flex and the flexible membrane to contract on the inside of the bend and expand by an equal or near equal amount on the outside of the bend resulting in a constant volume joint that requires low or no torque throughout the bending motion.

In one version, the flexible membrane includes a bellows structure with convolutions each having a valley between spaced peaks and the support ribs are fitted inside the peaks of the bellows structure. The axial support structure preferably includes a pivot socket coupled to each support rib. In one design, the axial support structure further includes a retainer ring about each support rib. The retainer rings may be clamped over peaks of the bellows structure and each retainer ring includes an interior channel receiving the bellows membrane and a support rib therein. A pivot socket may be coupled onto each retainer ring.

Preferably, each pivot socket includes opposing concave faces and the axial support structure further includes rigid pivot blocks each including opposing convex faces each received adjacent a concave face of a pivot socket. There may be a top plate for each pivot socket coupled over the convex faces of adjacent rigid pivot blocks, for the purpose of retaining the pivot blocks.

In one design, each pivot socket is internal to the joint and directly coupled to each support rib. The joint system may further include roller bearings between the concave faces of a pivot socket and the convex faces of an adjacent pivot block. Also, a pivot socket may include opposing rails and each pivot block may include opposing tracks each receiving a rail of a pivot socket therein. Tie bars may be used to interconnect the pivot sockets and the pivot blocks.

In still another version, the axial support structure includes a first frame member, a second frame member, and interface members between the first frame member and the second frame member. The first frame member is coupled to one end of each interface member and the second frame member is coupled to an opposite end of each interface member.

The joint system may include multiple membrane plies and optionally a shear layers between said plies. The membrane may be a composite structure. The joint system may also include one or more rotary joints in conjunction with the flexible membrane joint.

Also featured is a flexible sealed joint comprising a flexible bellows membrane, spaced support ribs disposed inside the membrane, a pivot socket member coupled to each support rib, and a pivot block between adjacent pivot socket members. Preferably a pivot socket member includes opposing concave faces and a pivot block includes opposing convex faces.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
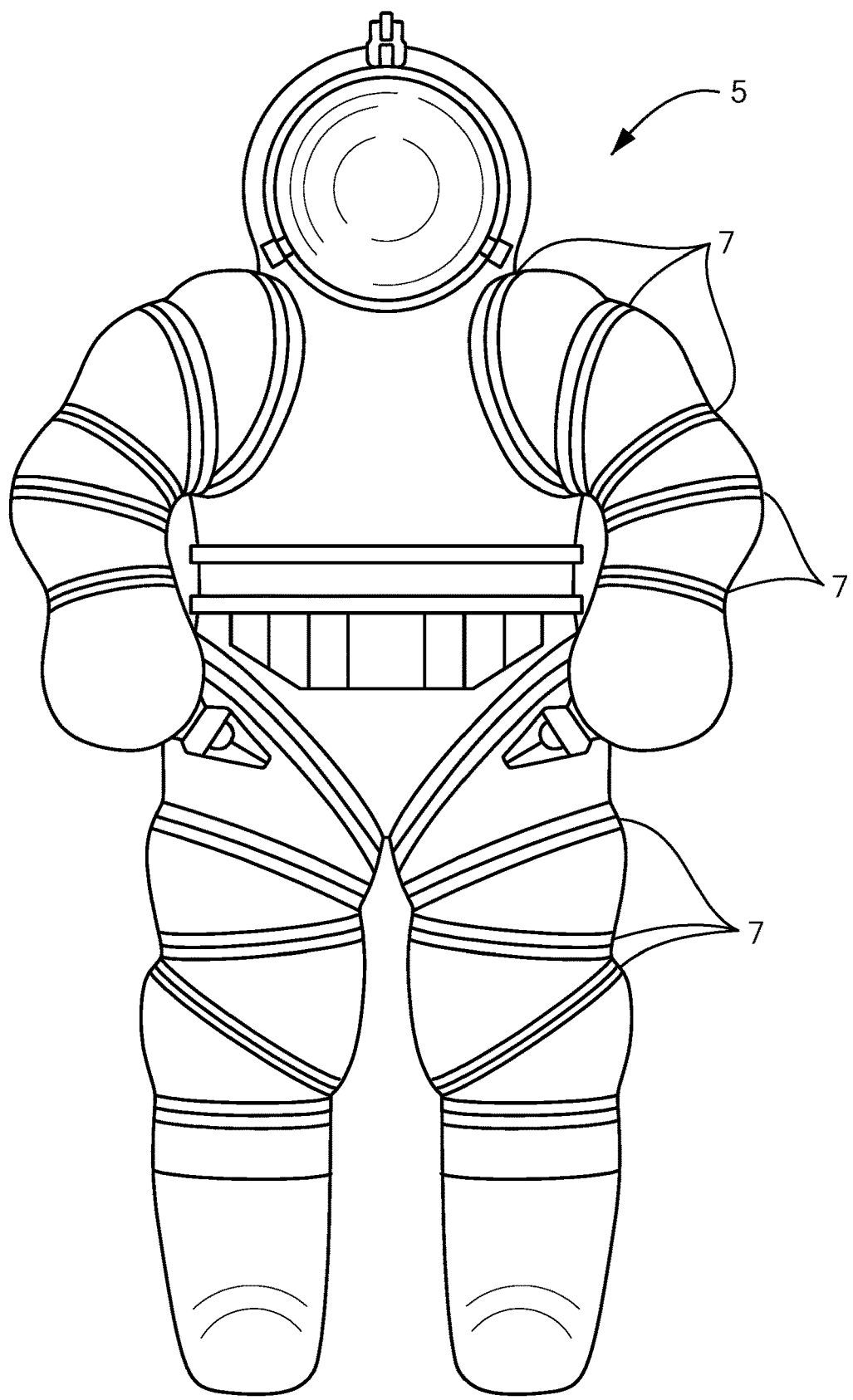
FIG. 1 is a schematic view of an atmospheric diving suit which may employ the constant volume flexible joint system of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

One preferred membrane ADS joint is comprised of a continuous membrane layer (or layers) draped over rigid annular support ribs. These support ribs are then connected axially to keep the external hydraulic pressure from axially deforming (collapsing) the joint. These axial connections are pivoted in such a way that the joint is able to flex with little bending resistance aside from resistance created by the membrane material itself (minimal compared to the hydrostatic pressure acting on the surface of the joint). Without the mechanical pivoting system, the external pressure on the ADS joint could make it nearly impossible to bend at depth because of unbalanced forces. The ADS membrane joint pivot mechanism preferably maintains perfectly zero volume change within the joint at any possible joint position. By devising such a pivot, the forces acting on the membrane due to hydrostatic pressure are inherently neutralized. One design of the ADS membrane joint is segmented in nature where one basic design element will be stacked in series to create various joints or even appendages. A typical elbow joint will be comprised of four segments. Therefore, by describing a single segment the entire joint will also be understood. The axial pivots provide support to keep the joint at the proper length while also allowing pivoting between the ribs. This pivoting action is preferably carried out in such a way that the volume within the joint remains constant. A preferred pivot design uses pivot blocks that are inserted between each segment of the joint, these blocks have an arc cut on opposing faces which then ride in complementary sockets on each annular support rib. As the ribs rotate relative to each other this pivot block shifts up and down to adjust the instantaneous center of rotation between the ribs, thus cancelling any hydrostatic forces and maintaining constant volume within the flexible membrane. Additionally, the curved faces of the pivot block allows for a large surface area for axial load transfer through the joint. This large contact area reduces stress on the pivots and gives design flexibility to use a large range of roller bearing or low friction material options for the interface.

The continuous flexible membrane that is suspended over the annular support ribs provides the ability to customize the joint depending on safety and usage requirements. A single rugged membrane could be used, rubber reinforced with steel wire, super-elastic shape memory alloy (which would allow for increased stretch ability over steel wires), or many thin fiber (such as Kevlar) reinforced membranes could be nested and oil filled between. The second option would reduce material resistance to bending since shear could not be transferred between layers. Additionally, by adding multiple layers, redundancy is added to the system. Even if one or more layers are punctured there would be underlying layers as backup. Potentially, a very large number of layers could be used; creating extremely safe ADS while maintaining good flexibility.

Figure 2:
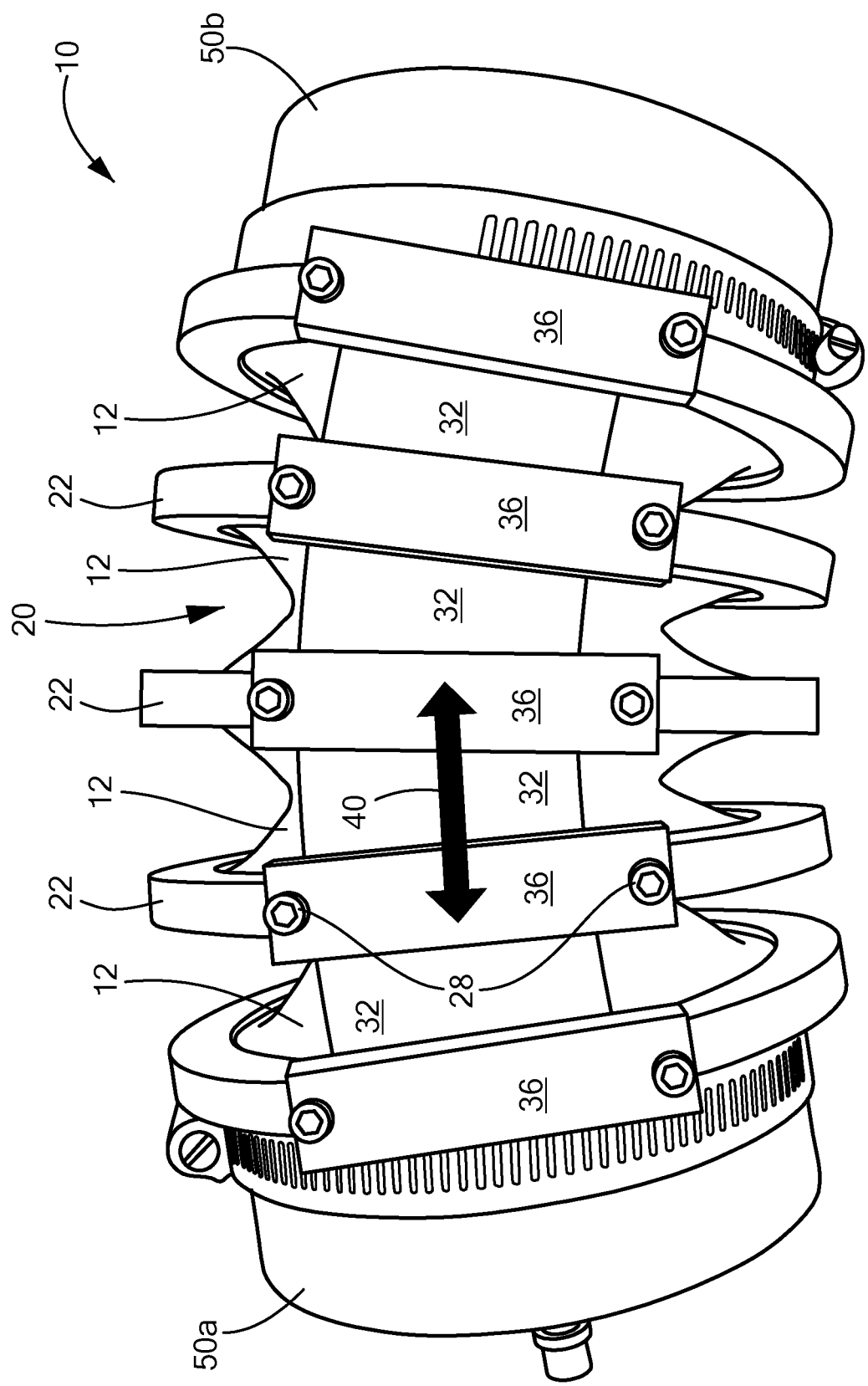
FIG. 2 is a schematic top view of a four segment zero volume change and thus a zero bending moment membrane joint in accordance with an example of the invention.
Figure 3:
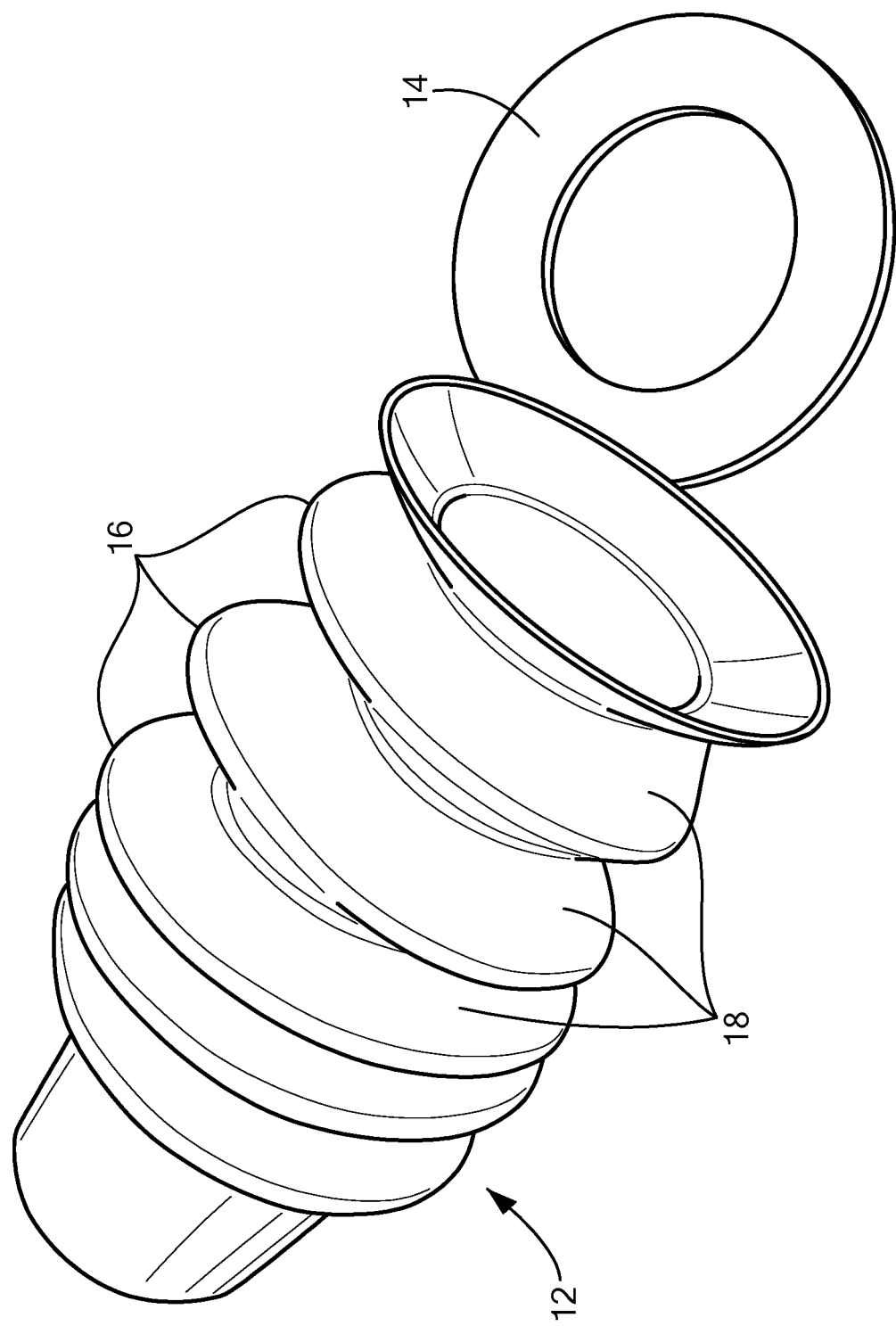
FIG. 3 is a schematic view showing the flexible membrane and a support rib of the joint of FIG. 2.

FIG. 1 shows an ADS 5 and various joints 7 where the invention may be employed. FIGS. 2-10 show an example of a constant volume joint system 10 including a flexible bellows membrane 12, FIGS. 2-3 for coupling across a diving suit joint (e.g., an elbow, knee, wrist, shoulder, and the like). End caps 50a, 50b may be coupled to rigid shell portions of the ADS. In this particular example, spaced rigid radial support ribs 14, FIGS. 3-4 (e.g., circular and made of metal) are fitted inside the peaks 16 of the membrane convolutions. The ribs may have other shapes. Thus, the interior ribs are spaced on either side of bellows membrane valleys 18. An axial support structure 20, FIG. 2 is configured such that it is coupled to the spaced radial support ribs to prevent external hydraulic pressure from collapsing the joint axially. This axial support structure includes pivoting portions enabling the joint to flex and bend and the flexible membrane to contract on the inside of the bend and expand by an equal or near equal amount on the outside of the bend. Preferably there are opposing axial support structures one of which is shown in FIG. 2.

Figure 4:
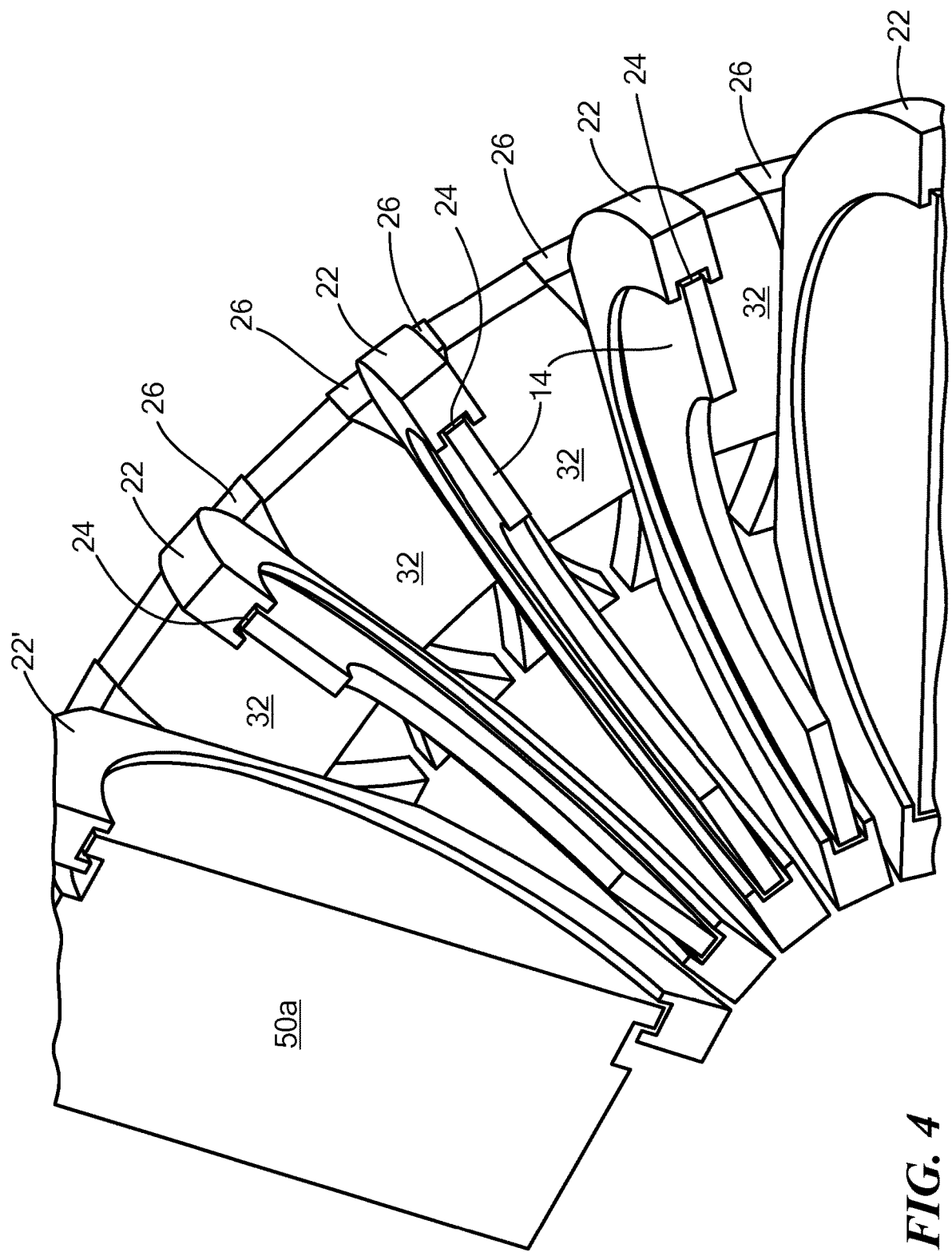
FIG. 4 is a schematic view showing the interior of the joint system of FIG. 2.
Figure 9:
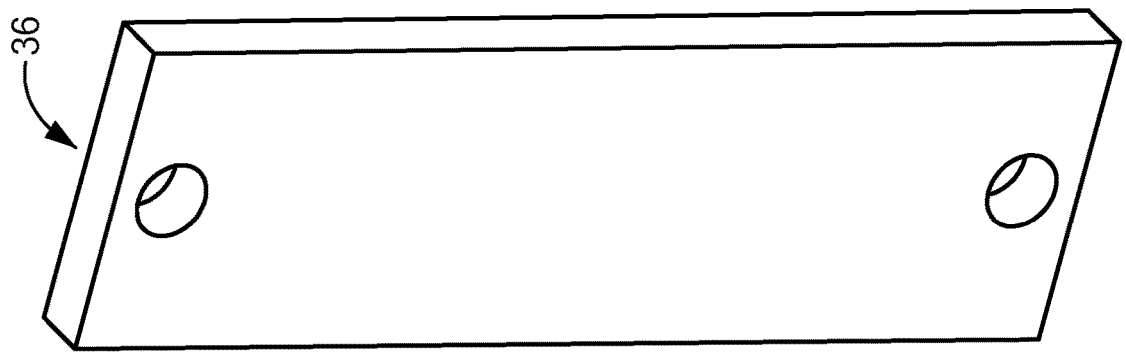
FIG. 9 is a schematic three dimensional view of an example of a top plate.
Figure 8:
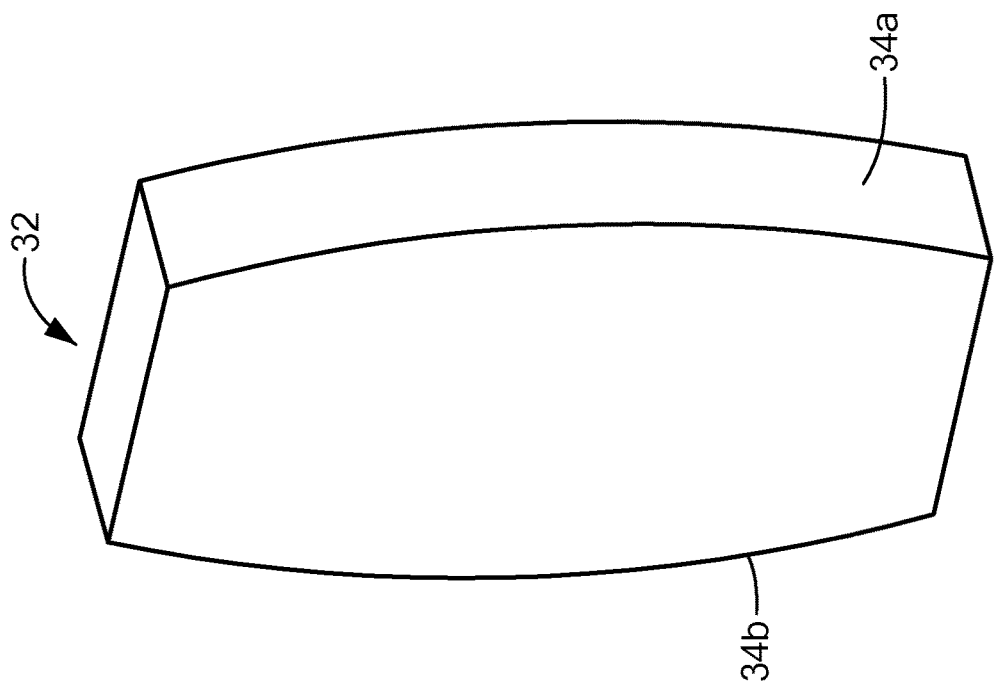
FIG. 8 is a schematic three dimensional view of an example of a pivoting block.
Figure 7:
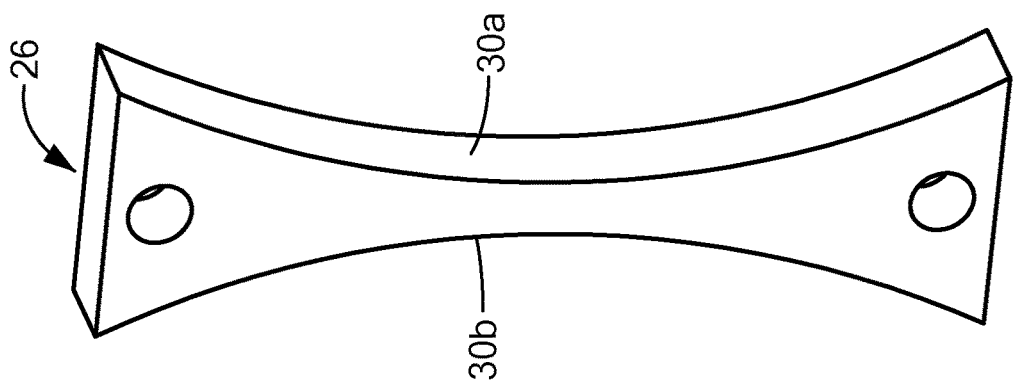
FIG. 7 is a schematic three dimensional view of an example of a pivoting socket.

In this particular example, each axial support structure 20 includes rigid retainer rings (e.g., split rings) 22, FIG. 4 clamped over the peaks of the bellow structure so interior ring channels 24 receive the bellows material and a support rib therein. One or more retaining rings 22' may also be disposed about the end caps as well. The preferred axial support structure further includes a pivot socket member 26, FIGS. 4-7 coupled to each support rib by affixing each socket member 26 to a retainer ring 22 by fasteners 28, FIG. 2 extending through a hole in the pivot socket member and threaded into a threaded hole in the retainer ring. Each metal or composite pivot socket 26, FIGS. 5-7 includes opposing front and rear concave arc-shaped faces or sockets 30a and 30b which may be coated with a low friction material such as Teflon. Rigid pivot blocks 32 each have opposing convex arc-shaped front and rear faces 34a, 34b received and fitting in the concave arc sockets 30a and 30b of adjacent pivot sockets 26. Top plates 36, one for each pivot socket, are coupled over the convex surfaces 34a and 34b of each pivot block 32 and over the concave surfaces of each pivot socket 26 to retain the rigid pivot blocks 32 adjacent their respective pivot sockets. The convex surfaces 34 of the pivot blocks mate against the concave surfaces of the pivot sockets in a movable fashion and are held there by the top plates 36. FIG. 7 shows a pivot socket member, FIG. 8 shows a pivot block, and FIG. 9 shows a top plate.

Figure 10:
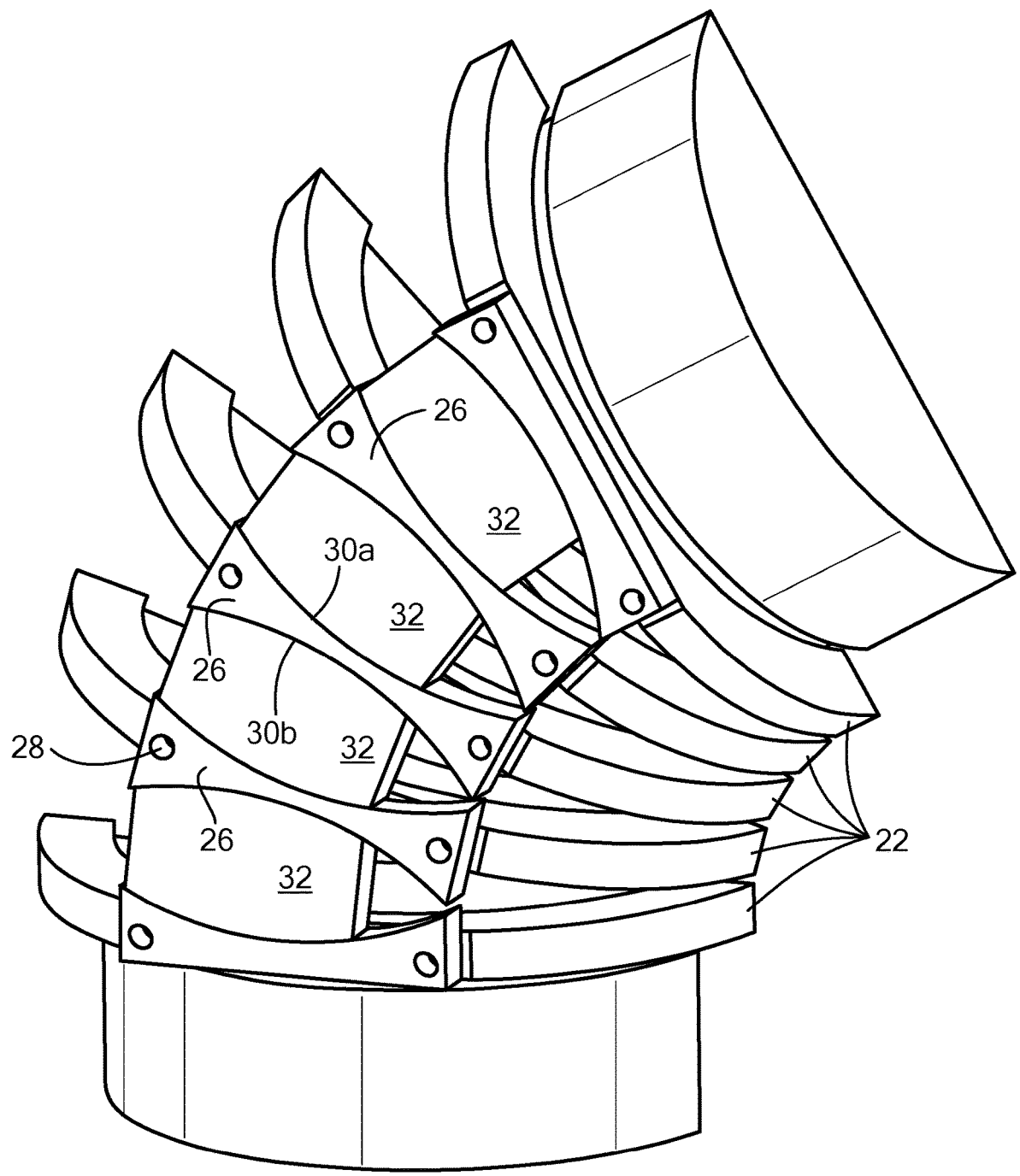
FIG. 10 is another schematic three dimensional view showing the relationship between the pivoting blocks and the pivoting sockets.

The rigid pivot blocks 32 extending between the adjacent pivot sockets 26 which are coupled to adjacent retainer rings 22 (themselves coupled to a support rib) prevent the flexible bellows from contracting axially along the long axis or the joint in the direction shown by arrow 40, FIG. 2 at diving depths where the outside pressure is much higher than the inside pressure of the suit (which is typically at atmospheric pressure). At the same time, the axial support structure allows the joint system to bend as shown in FIG. 10 as the rigid pivot blocks 32 convex faces 34 articulate slightly in the respective concave surfaces 30 of the pivot sockets 26.

The flexible bellows membrane contracts on the inside of the bend and expands by an equal or near equal amount on the outside of the bend and thus the flexible bellows membrane maintains a constant or near constant volume. Large volume changes of a dive suit joint at depths where the outside pressure is high would result in a situation where the diver could not bend or otherwise articulate the joint. This particular pivot mechanism is formulated and designed specifically for this purpose of keeping the volume within the membrane constant during articulation. Depending on exact membrane geometry used in a particular joint, the characteristics of the pivot blocks and sockets must be tailored. This membrane joint approach can be used to engineer joints which allow for both rotation and twist as well.

The membrane joint approach is not only applicable to elbow and knee joints (fairly two dimensional) but can be expanded for use on many joints on the ADS including more complicated shoulder and hip joints. The pivot block mechanical balance mechanism is scalable and will not be as susceptible to decreased motion at deeper depths which plagues the current rotary joints. The principle of keeping the joint constant volume is equally applicable under any level of hydrostatic loading.

The segmented nature of the design, coupled with the flexibility of the membrane itself could allow for some degree of rotation or twist capability to be designed into each segment bulkhead.

The membrane itself may be a reinforced rubber material; however, a thin metal or composite could be used for the membrane (i.e. steel bellows) as long as it was thin enough to allow for proper flexibility. Additionally, for a multi-layered approach, rubber layers and metals layers could be interleaved as a means of building additional factor of safety or specific bending performance.

Figure 11:
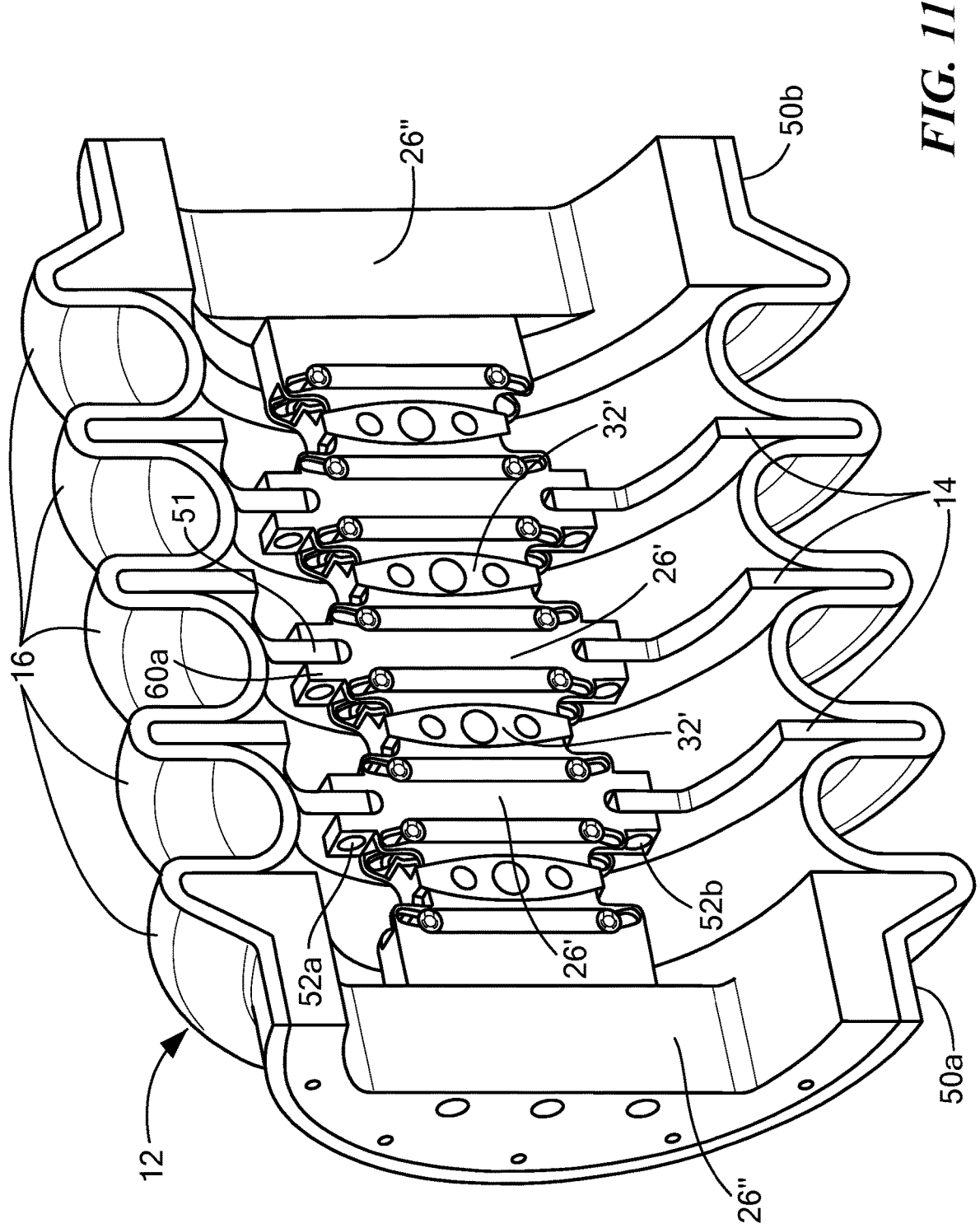
FIG. 11 is a schematic three dimensional cut-away view showing the interior of another embodiment of a joint system.

In another version shown in FIG. 11, the opposing axial support structures are disposed inside the flexible bellows 12. Here, support ribs 14 are disposed inside the bellows peaks 16 between joint end caps 50a and 50b each coupled to a portion of the diving suit or other subsystems structure. Internal pivot sockets 26' are directly coupled to the support ribs 14 as shown via fasteners 52a, 52b. Pivot blocks 32' are also shown. There may be roller bearings between the pivot sockets and pivot blocks. Ball bearings or low friction bushing material may be used as well.

Figure 12:
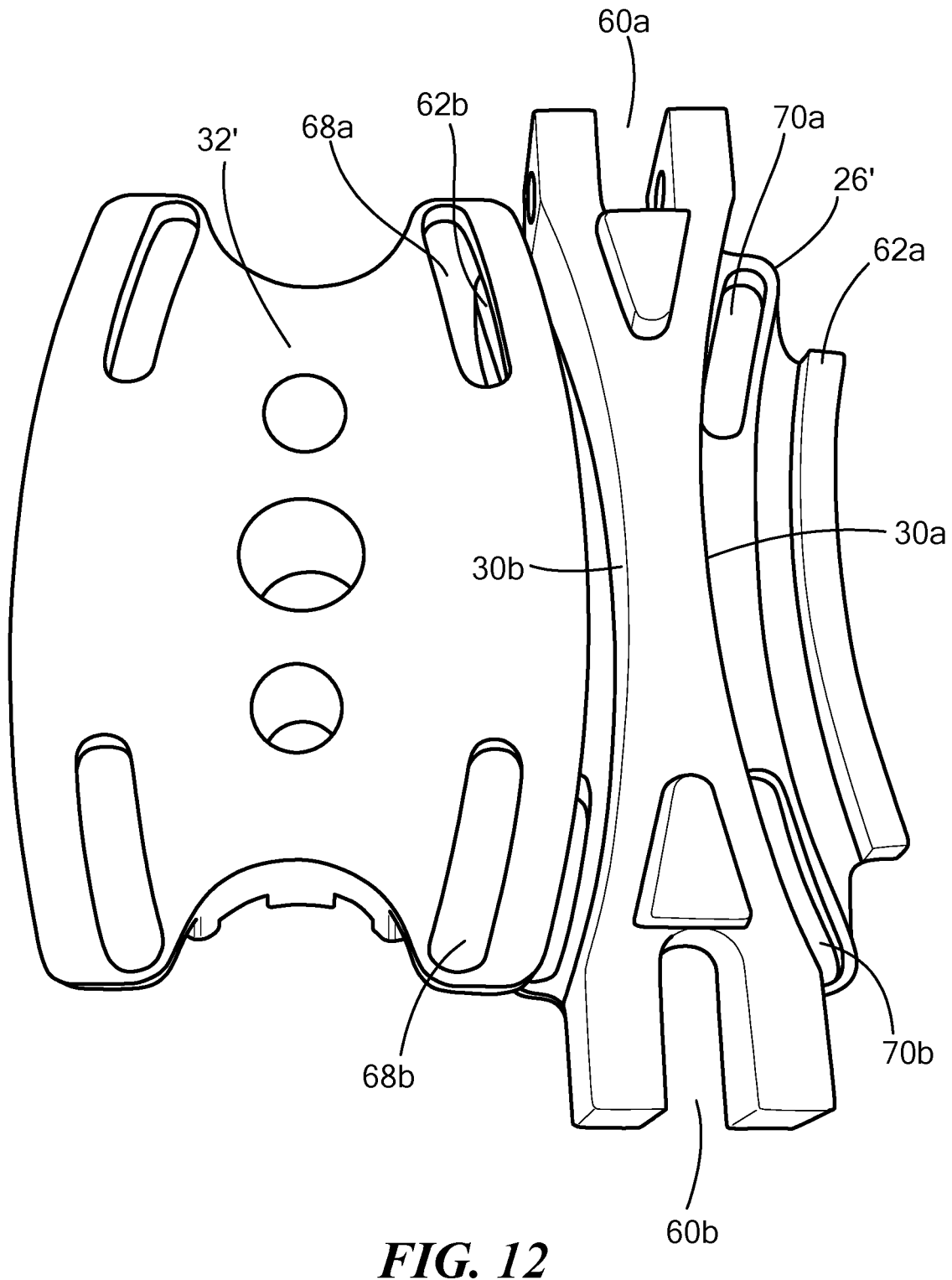
FIG. 12 is a schematic view showing a pivoting socket and a pivoting block for the axial support structure of the joint system shown in FIG. 11.
Figure 13:
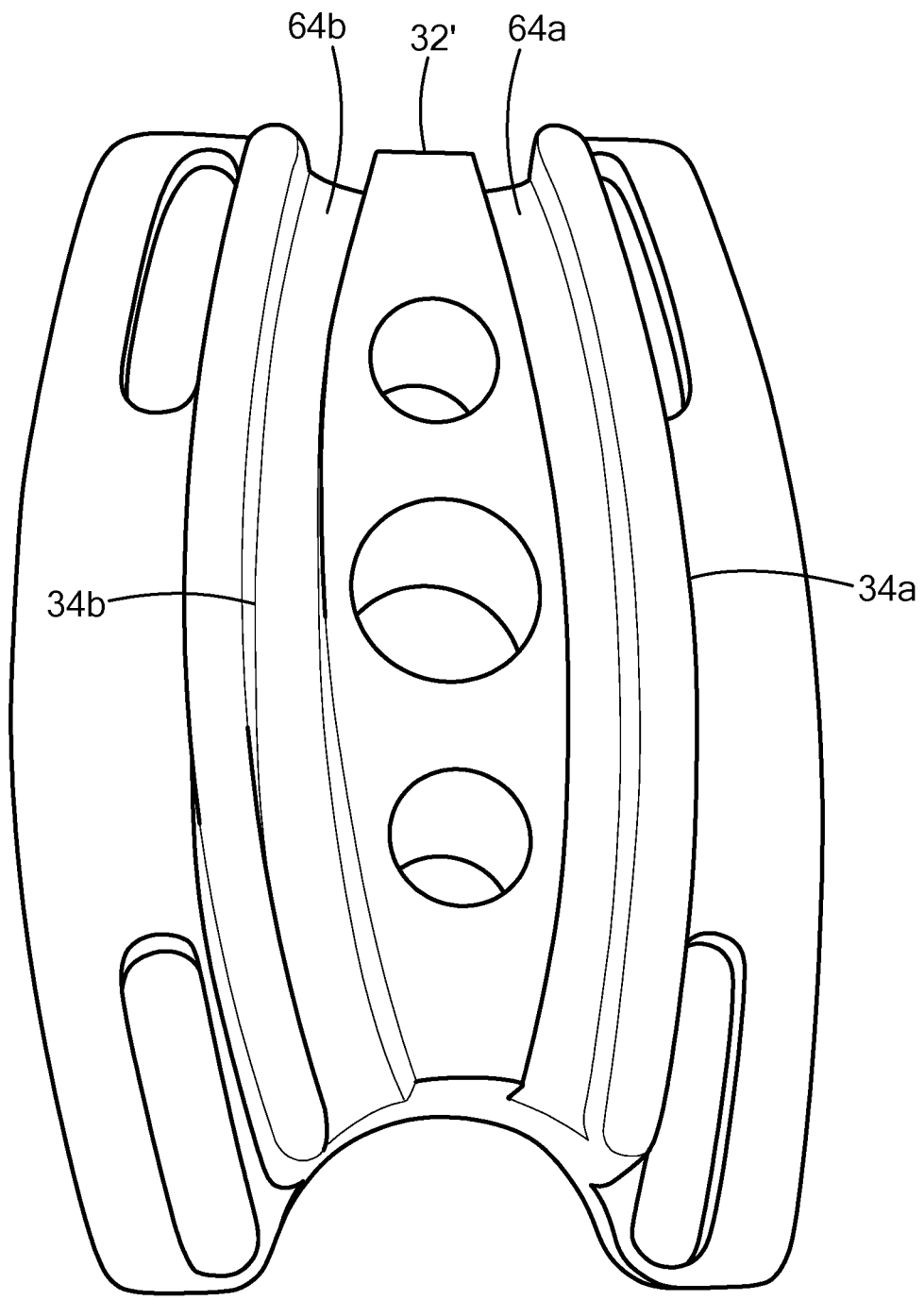
FIG. 13 is a schematic view showing the other face of the pivoting block shown in FIG. 12.
Figure 14:
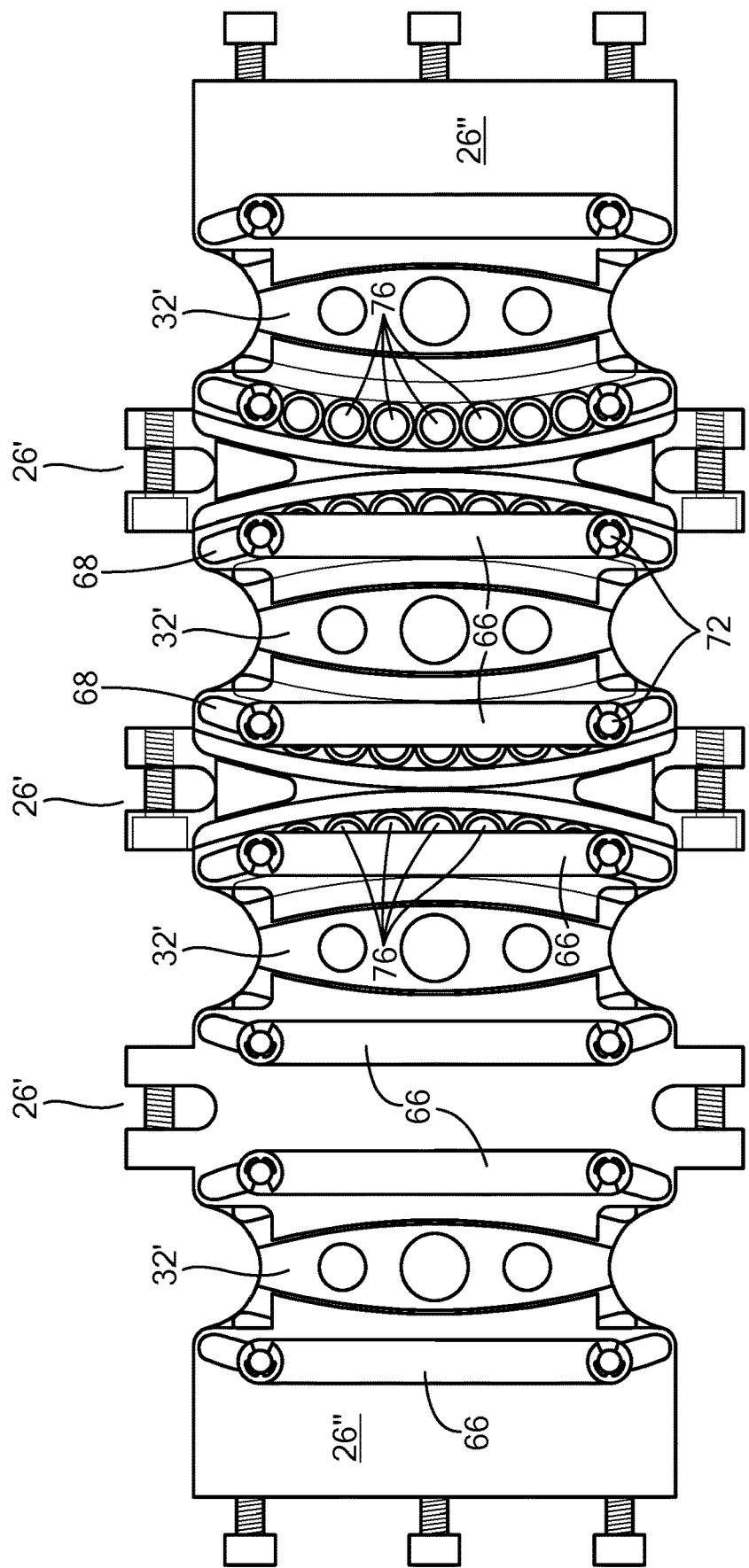
FIG. 14 is a schematic view showing the arrangement between the pivoting sockets and the pivoting blocks.

In one particular design, pivot socket 26', FIG. 12 includes opposing yoke sections 60a, 60b for coupling to tangs 51, FIG. 11 formed in the support rib, opposing concave surfaces 30a, 30b, FIG. 12 and opposing curved rails 62a, 62b. Each pivot block 32', FIGS. 12-13 includes opposing convex surfaces 34a, 34b and tracks 64a, 64b slideably receiving a rail 62, FIG. 12 of a pivot socket therein. Inner and outer tie bars 66, FIG. 14 are connected by pin 72 extending through races 68, FIG. 12 in the pivot blocks 32' and corresponding races 70 in the pivot sockets 26' to retain the roller bearing 76 in place and to pivotably couple a pivot block between adjacent pivot sockets. A hybrid pivot socket 26", FIG. 14 is used at the ends of the joint for coupling to an end cap 50a, 50b, FIG. 11.

Figure 15:
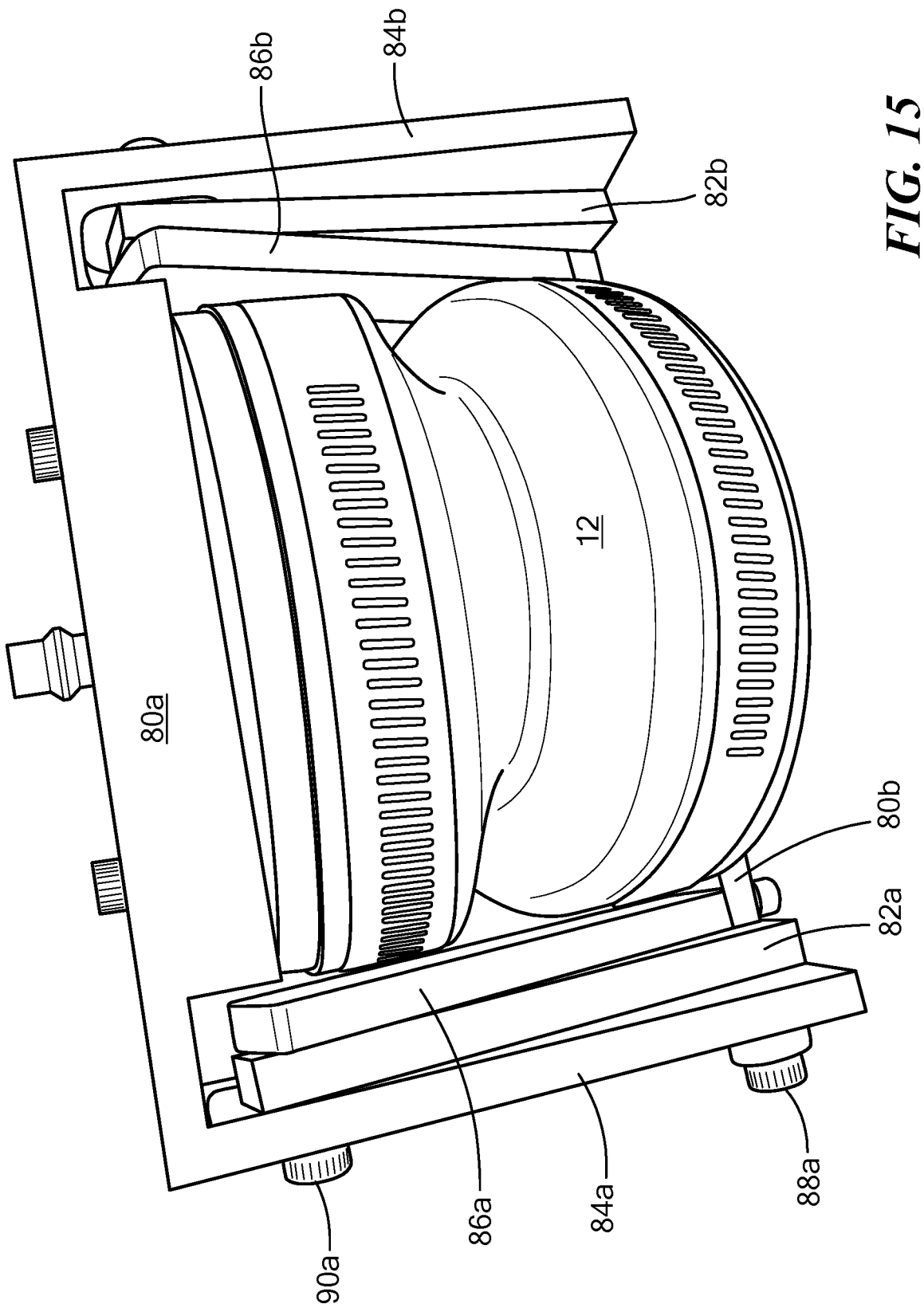
FIG. 15 is a schematic three dimensional front view showing another arrangement of an axial support system.
Figure 16:
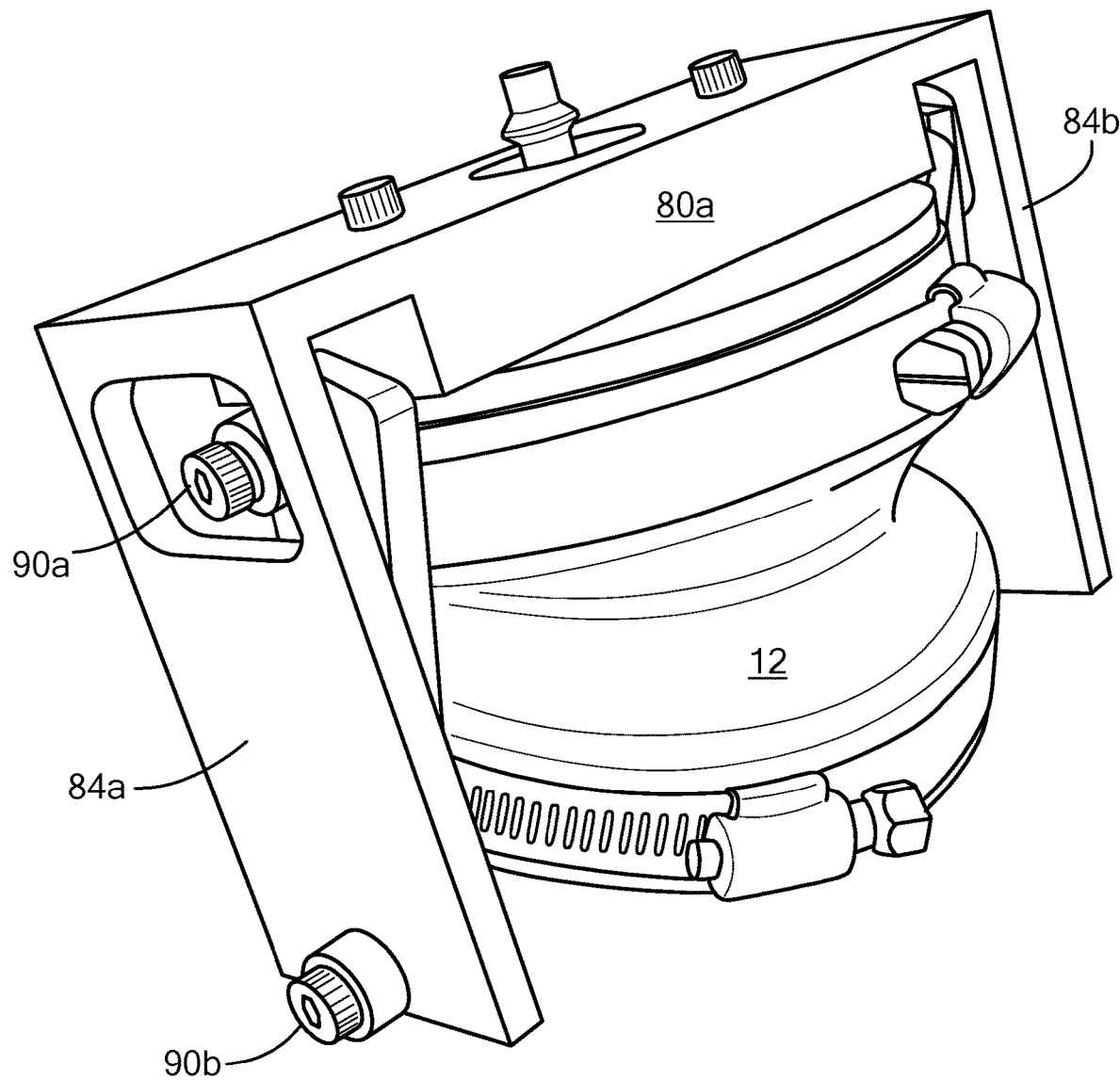
FIG. 16 is another schematic three dimensional view showing the joint of FIG. 15.
Figure 17:
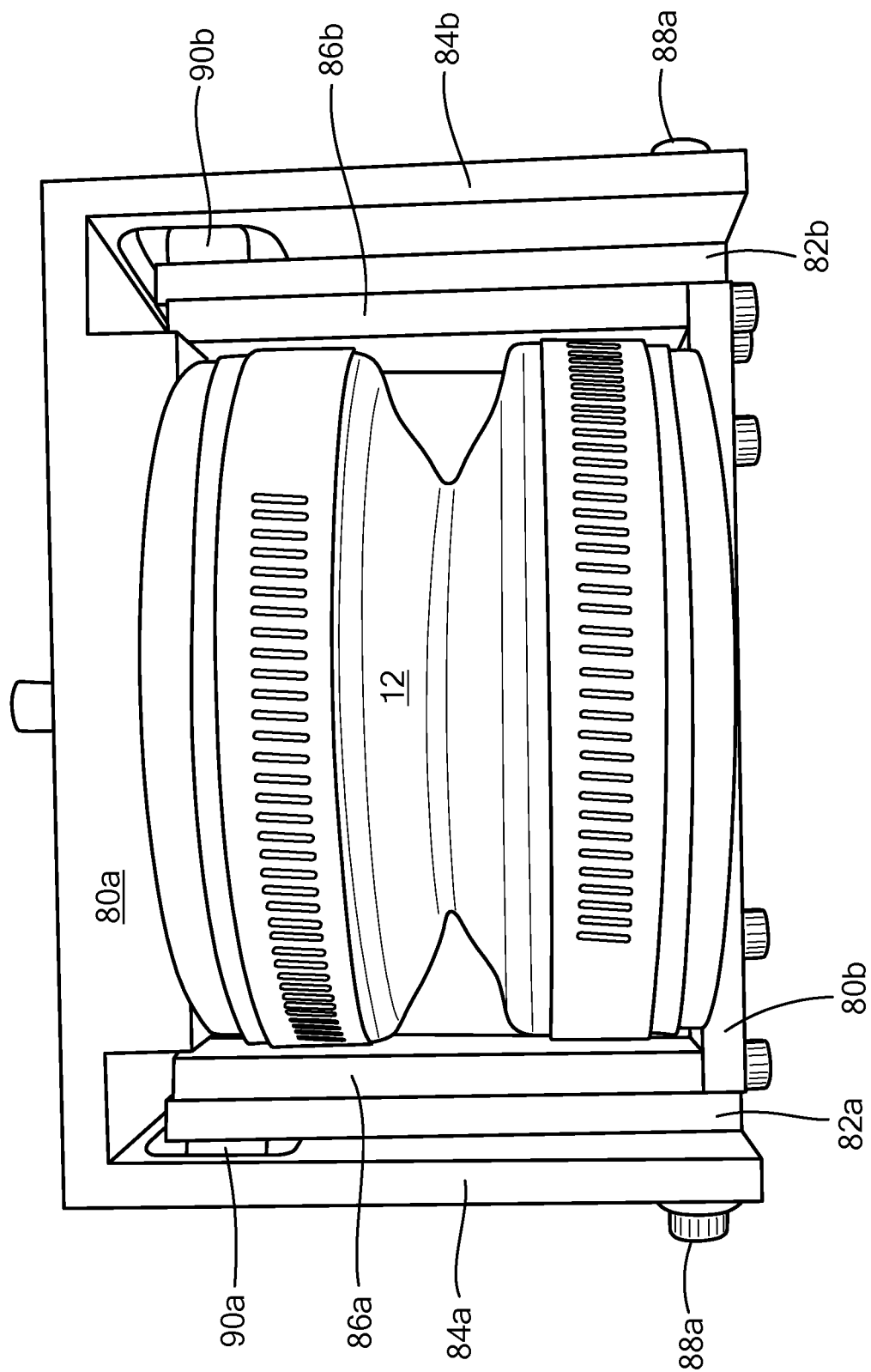
FIG. 17 is another schematic view of the joint system of FIGS. 15-16.

In another design, the axial support structure includes first U-shaped frame 80a, FIGS. 15-17 coupled to a first support rib and second U-shaped frame member 80b coupled to a second support rib. Interface members 82a, 82b are disposed between the arms 84a, 84b of the first frame member 80a and arms 86a, 86b of second frame member 80b. The interface members may be made of Teflon, for example. Or, the interface members can be metal coated with Teflon. Fastener 88a pins the distal end of arm 84a of first frame member 80a to one end of interface member 82a and fastener 90a pins the distal end of arm 86a of second frame member 80b to the opposite end of interface member 82a. The same arrangement is used on the other side of the joint. Fasteners 90 and 88 may include a rotary bearing disposed around a pin or shaft.

Besides the external structure shown in FIGS. 2-10, the internal arrangement shown in FIGS. 11-14, and the frame member arrangement shown in FIGS. 15-17, there are other designs for a joint system with one or more axial support structures preventing a pressure differential from axial deformation of the joint. In a diving suit arrangement, it is the external pressure which will collapse the joint if the axial support structure were not present. The axial support structure, in any design, includes pivoting portions enabling the joint to flex and the flexible membrane to contract on the inside of the bend and to expand by an equal or near equal amount on the outside of the bend resulting in a constant volume joint that requires low or no torque throughout the bending motion.

The membrane, preferably a bellows, in any version of the joint, may be made of a composite material, for example Aramid fibers reinforced with a polyurethane. The bellows may include more than one ply of material for redundancy. A shear layer (for example fabric or a fluid) may be disposed between the plies.

The metal components, for example the pivoting blocks, socket members, ribs, end caps, pivoting frames, and the like may be machined aluminum or titanium. The end caps may be preferably bonded inside the membrane.

Further, a given joint such as a shoulder joint may further include a rotating joint as well. For example, end cap 50a, 50b, FIG. 11 could each be fastened to a rotary joint. Alternatively, there could be rotating joint, for example, disposed between two adjacent sections or segments of a given axial support structure.

Figure 5:
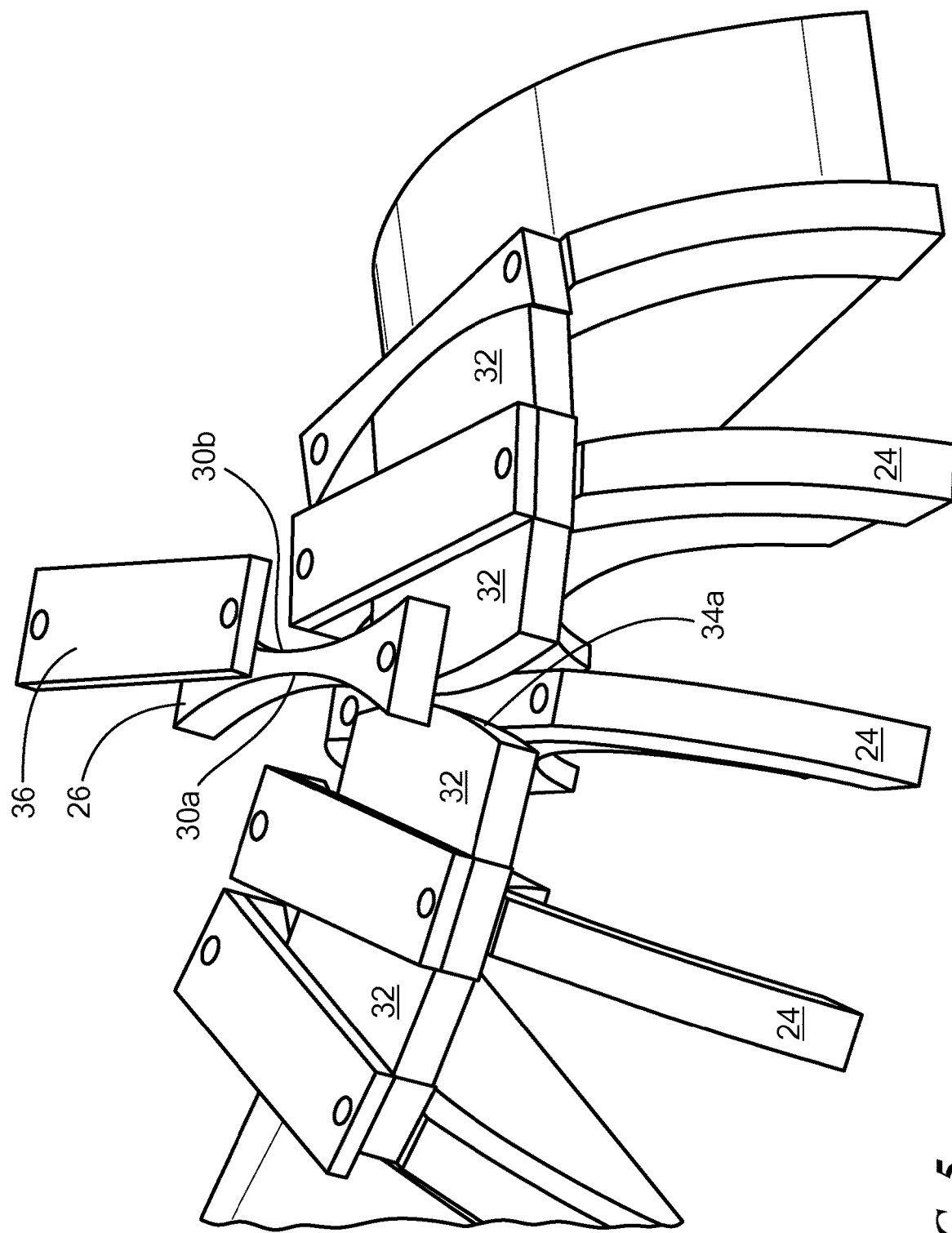
FIG. 5 is a schematic view showing the primary components associated with the axial support structure of the joint system of FIG. 2.
Figure 6:
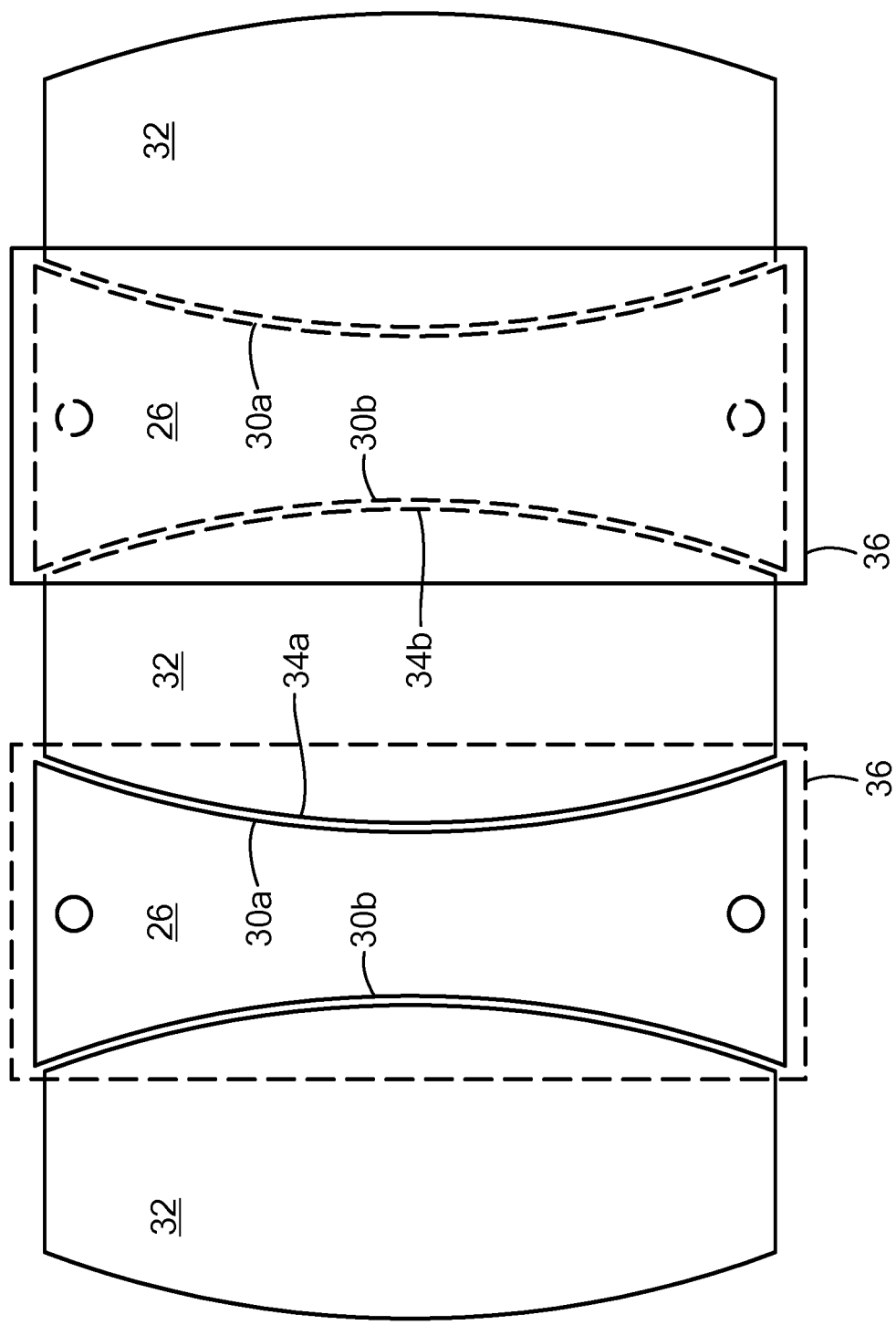
FIG. 6 is a schematic top view showing the relationship between the pivoting sockets and the pivoting blocks of the axial support system shown in FIG. 5.

The flexible joints described herein are particularly suited to ADS joints but could be used elsewhere, in spacesuits or for underwater robot arms and the like. For a spacesuit application, a mechanical link (such as a spring) would be needed, for example, to preload the pivot joint due to the now increased internal pressure. In FIG. 5, for example, springs would be connected between adjacent top plates 36 pulling them together.

In one aspect, a constant volume in the joint is maintained via the flexible joints described above. When the volume of the joint changes while a pressure differential is present, it will either require work or release energy from the joint. Equation 1 illustrates this. Therefore, if the volume in the joint increases as it bends it will require additional bending moment to flex the joint since work will be done to displace the surrounding pressure differential (assuming the higher pressure is on the exterior). Alternatively, a reduction in volume as it flexes will aid the joint bending as energy is released from the system; but will fight the operator as the joint is re-straightened.

Interestingly, if the joint bending moment vs. bend angle is relatively linear, the bending torque at any given bend angle can be found by solving the integral shown in equation 1.

$$\text{Work} = \int_{Volume_{initial}}^{Volume_{final}} \text{Pressure} \cdot dVolume \quad (1)$$

Equation 2 is the relationship between torque and volume change when the torque vs. bend angle curve is linear derived by solving equation 1:

$$\text{Work} = \frac{1}{2}\text{Torque} \cdot \theta(\text{in rad}) = \text{Pressure} \cdot \Delta\text{Volume} \quad (2)$$

Equation 3 is the torque calculated based on volume change (if the torque-angle curve is linear).

$$\text{Torque} = \frac{2 \cdot \text{Pressure} \cdot \Delta\text{Volume}}{\theta(\text{in rad})} \quad (3)$$

The conclusion here is that if an active pivot geometry is created such that as the joint bends there is no change in volume then there will be no required bending moment.

The flexible joint design(s) use the concept of zero volume change during actuation to eliminate bending moments when the joint experiences a pressure differential between the interior and exterior. However, with minor tweaks to the geometry of the axial support structure within the flexible joint intentional volume change could be created. The exact rate and extent of the volume change during flexion could be tailored. This intentional volume change (either a decrease or increase) during joint flex would create a bending moment that could be induced and controlled, a potentially useful feature for many reasons. For example, if the material properties of the membrane are particularly stiff causing unexpected force to bend then a volume decrease within the joint could be designed. With a decrease in volume during bending, a moment towards a flexed position would be generated, helping to overcome the stiff membrane material.

This would be accomplished by creating a tailored pivot geometry, optimized for a specific condition or depth. However, when a user of such a tailored pivot geometry joint moves (i.e. curls their arm) it would be easier to move in one direction than the other depending on if diving deeper or shallower than the optimized depths. To overcome this an active or passive mechanism could be designed into the diving suit which assists a user in returning an unbalanced hydrostatic joint (such as one tailored for a certain depth) back to stasis.

In one embodiment, such as an atmospheric diving suits, small actuators could be used in parallel with the human appendage to move (or manipulate the shape of) the pivot blocks to augment or assist the human's motions and loads. For instance, this active mechanism could be implemented to assist joint deflection in either direction to overcome membrane material stiffness, human fatigue, undersea currents, or mechanical assistance to manipulate "heavy" non-buoyant weights.

In one embodiment, such as an atmospheric diving suits, small variations in the internal pressure could intentionally be commanded to augment or assist the humans motions and force capability. This could be limited to approximately +−15% of atmospheric pressure for diver safety, but would be a means to easily trim the system in response to unexpected external or material loads. Small changes in internal pressure will have great effect on load capability of the active assistance.

The nature of the design is to balance hydrostatic loading to create easy motion despite pressure differentials. In another embodiment the technology could be used to create a stand-alone actuator joint/arm. Careful pivot design coupled with varying the internal pressure of the joint relative to the external pressures could be means to produce a unique type of actuator for a ROV arm, robot arm, crane arm or similar. In this case large pressure differentials could be used to create massive lifting capability, while still having fine control over arm motion.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A constant volume flexible joint system comprising:
a flexible membrane for coupling across a joint;
spaced radial support ribs fitted to the membrane;
at least one axial support structure coupled to the spaced radial support ribs preventing a pressure differential from axial deformation of the joint; and
the axial support structure including pivoting portions having convex faces moveably mated to pivoting portions having concave faces for preventing the flexible membrane from contracting axially and enabling the joint to flex and the flexible membrane to contract on the inside of a bend and expand on the outside of the bend resulting in a constant volume joint.

2. The joint system of claim 1 in which the flexible membrane includes a bellows structure with convolutions each having a valley between spaced peaks.

3. The joint system of claim 2 in which the support ribs are fitted inside peaks of the bellows structure.

4. The joint system of claim 3 in which the axial support structure pivoting portions having concave faces are socket members coupled to support ribs.

5. The joint system of claim 4 in which the axial support structure further includes a retainer ring about each support rib.

6. The joint system of claim 5 in which the retainer rings are clamped over peaks of the bellows structure and each retainer ring includes an interior channel receiving the bellows membrane and a support rib therein.

7. The joint system of claim 5 in which the pivot socket members are coupled onto the retainer rings.

8. The joint system of claim 4 in which each pivot socket member includes opposing concave faces.

9. The joint system of claim 8 in which the axial support structure pivoting portions having convex faces are rigid pivot blocks each including opposing convex faces received in concave faces of adjacent pivot socket members.

10. The joint system of claim 9 further including a top plate for each pivot socket member coupled over the convex faces of adjacent rigid pivot blocks.

11. The joint system of claim 9 in which each pivot socket member is internal to the joint and directly coupled to each support rib.

12. The joint system of claim of claim 11 further including bearings between the concave faces of a pivot socket member and the convex faces of an adjacent pivot block.

13. The joint system of claim 11 in which each pivot socket member includes opposing rails and each pivot block includes opposing tracks each receiving a rail of a pivot socket member therein.

14. The joint system of claim 13 further including tie bars interconnecting the pivot socket members and the pivot blocks.

15. The joint system of claim 1 in which the axial support structure includes a first frame member, a second frame member, and interface members between the first frame member and the second frame member, the first frame member coupled to one end of each interface member and the second frame member coupled to an opposite end of each interface member.

16. The joint system of claim 1 in which there are multiple membranes in layers.

17. The joint system of claim 16 further including a shear layer between said membrane layers.

18. The joint system of claim 16 in which each layer is a composite structure.

19. The joint system of claim 1 further including one or more rotary joints in conjunction with said flexible joint system.

20. The flexible sealed joint of claim 1 in which the axial support structure pivoting portions enable the joint to flex and the flexible membrane to contract on the inside of a bend and expand by an equal amount on the outside of the bend.

21. The flexible scaled joint of claim 20 in which the axial support structure pivoting portions enabling the joint to flex and the flexible membrane to contract on the inside of a bend and expand by an equal amount on the outside of the bend results in a constant volume joint that requires no torque throughout the bending motion.

22. A flexible sealed joint comprising:
a flexible bellows membrane having peaks and valleys;
spaced support ribs disposed inside the flexible bellows membrane in the flexible membrane peaks;
pivot socket members having concave faces, said pivot socket members coupled to the spaced support ribs; and
pivot blocks having convex faces between adjacent pivot socket members, said pivot block convex faces moveably mated to the concave faces of the pivot socket members.

23. The flexible sealed joint of claim 22 in which each pivot socket member includes opposing concave faces and each pivot block includes opposing convex faces.

24. The flexible sealed joint of claim 22 further including a top plate coupled to each pivot socket member over concave faces of the pivot socket member and convex faces of adjacent pivot blocks.

25. The flexible sealed joint of claim 22 in which the pivot socket members are coupled internally to the support ribs.

26. The flexible sealed joint of claim of claim 22 further including bearings between the concave faces of a pivot socket member and the convex faces of an adjacent pivot block.

27. The flexible sealed joint of claim 22 in which each pivot socket member includes opposing rails and each pivot block includes opposing tracks each receiving a rail of a pivot socket therein.

28. The flexible sealed joint of claim 22 further including tie bars interconnecting the pivot socket members and the pivot blocks.

* * * * *